United States Patent
Wakabayashi

(10) Patent No.: US 7,516,164 B2
(45) Date of Patent: Apr. 7, 2009

(54) DATA TRANSFER METHOD AND SERVER COMPUTER SYSTEM

(76) Inventor: Noboru Wakabayashi, c/o Hitachi, Ltd., Intellectual Property Group, New Marunouchi Bldg., 5-1, Marunouchi 1-chome, Chiyoda-ku, Tokyo (JP) 100-8220

( * ) Notice: Subject to any disclaimer, the term of this patent is extended or adjusted under 35 U.S.C. 154(b) by 315 days.

(21) Appl. No.: 10/893,736

(22) Filed: Jul. 15, 2004

(65) Prior Publication Data

US 2005/0125413 A1    Jun. 9, 2005

(30) Foreign Application Priority Data

Dec. 8, 2003    (JP) ............... 2003-408404

(51) Int. Cl.
*G06F 12/00* (2006.01)
*G06F 17/30* (2006.01)
*G06F 15/16* (2006.01)

(52) U.S. Cl. ............... 707/201; 707/203; 709/227; 709/231; 709/232

(58) Field of Classification Search .......... 707/10
See application file for complete search history.

(56) References Cited

U.S. PATENT DOCUMENTS

| | | | |
|---|---|---|---|
| 5,938,741 A * | 8/1999 | Itoh et al. ............... | 710/6 |
| 6,085,229 A * | 7/2000 | Newman et al. ............ | 709/203 |
| 6,308,203 B1 * | 10/2001 | Itabashi et al. ............... | 709/217 |
| 6,457,062 B1 * | 9/2002 | Pivowar et al. ............... | 709/248 |
| 6,601,092 B2 * | 7/2003 | Itabashi et al. ............... | 709/217 |
| 2003/0065536 A1 * | 4/2003 | Hansen et al. ................. | 705/2 |

FOREIGN PATENT DOCUMENTS

JP    2000-215160    8/2000

\* cited by examiner

*Primary Examiner*—John R. Cottingham
*Assistant Examiner*—Mariela D Reyes
(74) *Attorney, Agent, or Firm*—Townsend and Townsend and Crew LLP

(57) ABSTRACT

A server computer system generates, for data stored in a transmission source server, index information including a data identification number, a data type, information for the data such as copyright information and an address of a server whereat the data are stored, and transmits only the index information to a hand-held information terminal carried by the owner of the transmission source server, thereby, a data transfer is requested for transferring, to a transmission destination server, data indicating the index information from the hand-held information terminal to the transmission destination server in accordance with the index information held by the hand-held information terminal and an address of the transmission destination server.

9 Claims, 12 Drawing Sheets

FIG.5

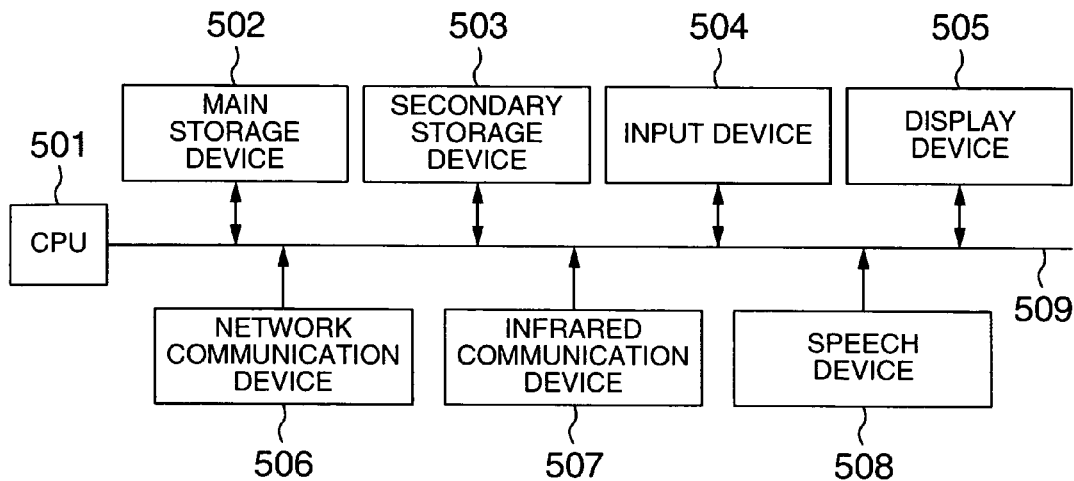

FIG.6

```
<server>123.123.123.123</server>  ~601
              \602
<generation>000</generation>  ~603
              \604
<MAXgeneration>005</MAXgeneration>  ~605
              \606
                                                                    607
<file ID="001" type="JPEG" copyright="ON" thumbnail="AUTUMN LEAVES_THUMBNAIL.jpg">AUTUMN LEAVES.jpg</file>
      \608    \609         \610            \611                              \612
```

FIG.7

```
<title>DATA LIST</title>
<list>
  <file ID="001" type="JPEG" copyright="ON" thumbnail="AUTUMN LEAVES_THUMBNAIL.jpg">AUTUMN LEAVES.jpg</file>
  <file ID="002" type="GIF" copyright="OFF"ANIMATION.gif</file>
  <file ID="003" type="MPEG" copyright="ON" thumbnail=ATHLETIC MEET_THUMBNAIL.jpg">ATHLETIC MEET.mpg</file>
  <file ID="004" type="TEXT" copyright="OFF">ReadMe.txt</file>
  <file ID="004" type="PNG" copyright="ON">PORTRAIT.png</file>
</list>
```

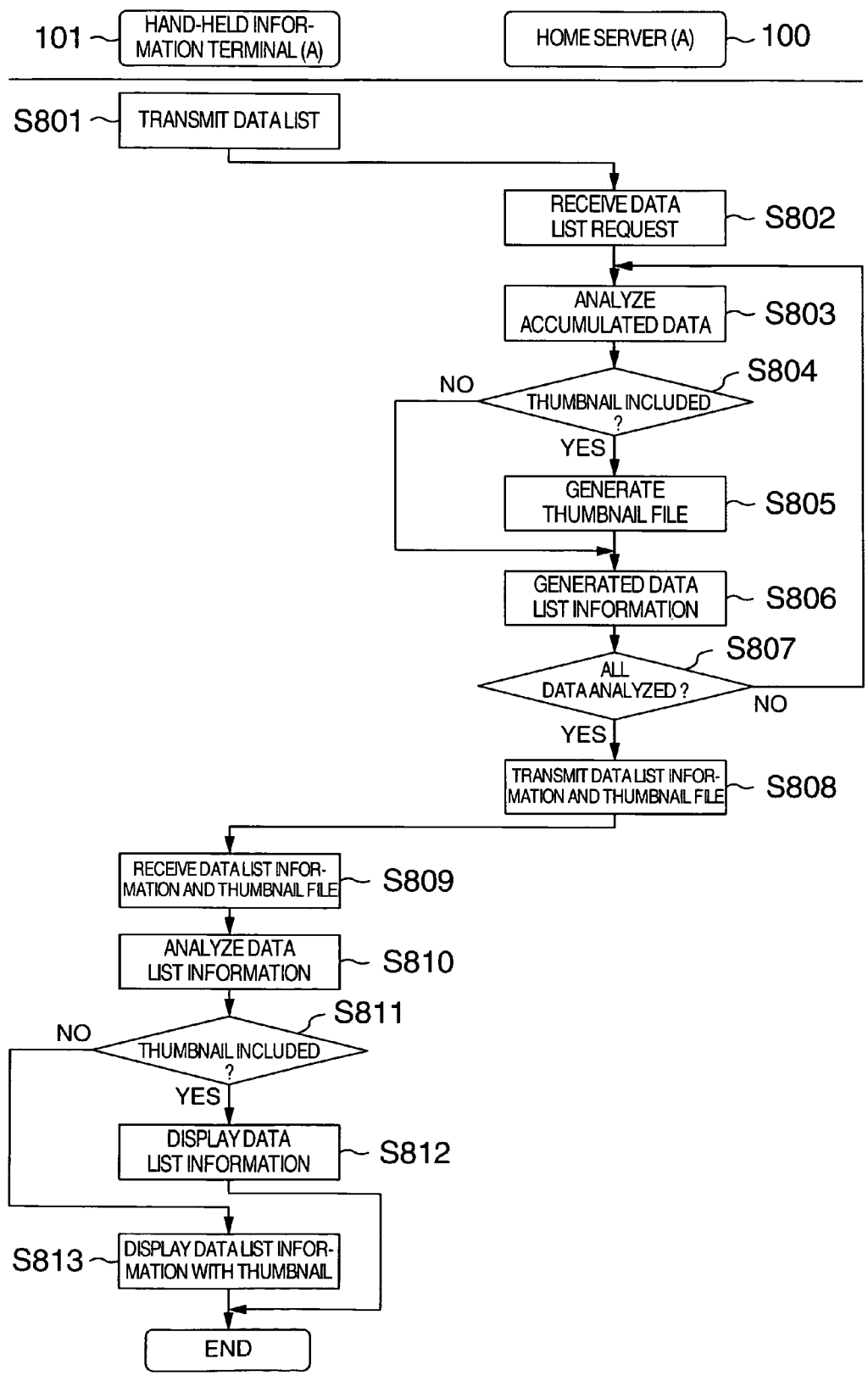

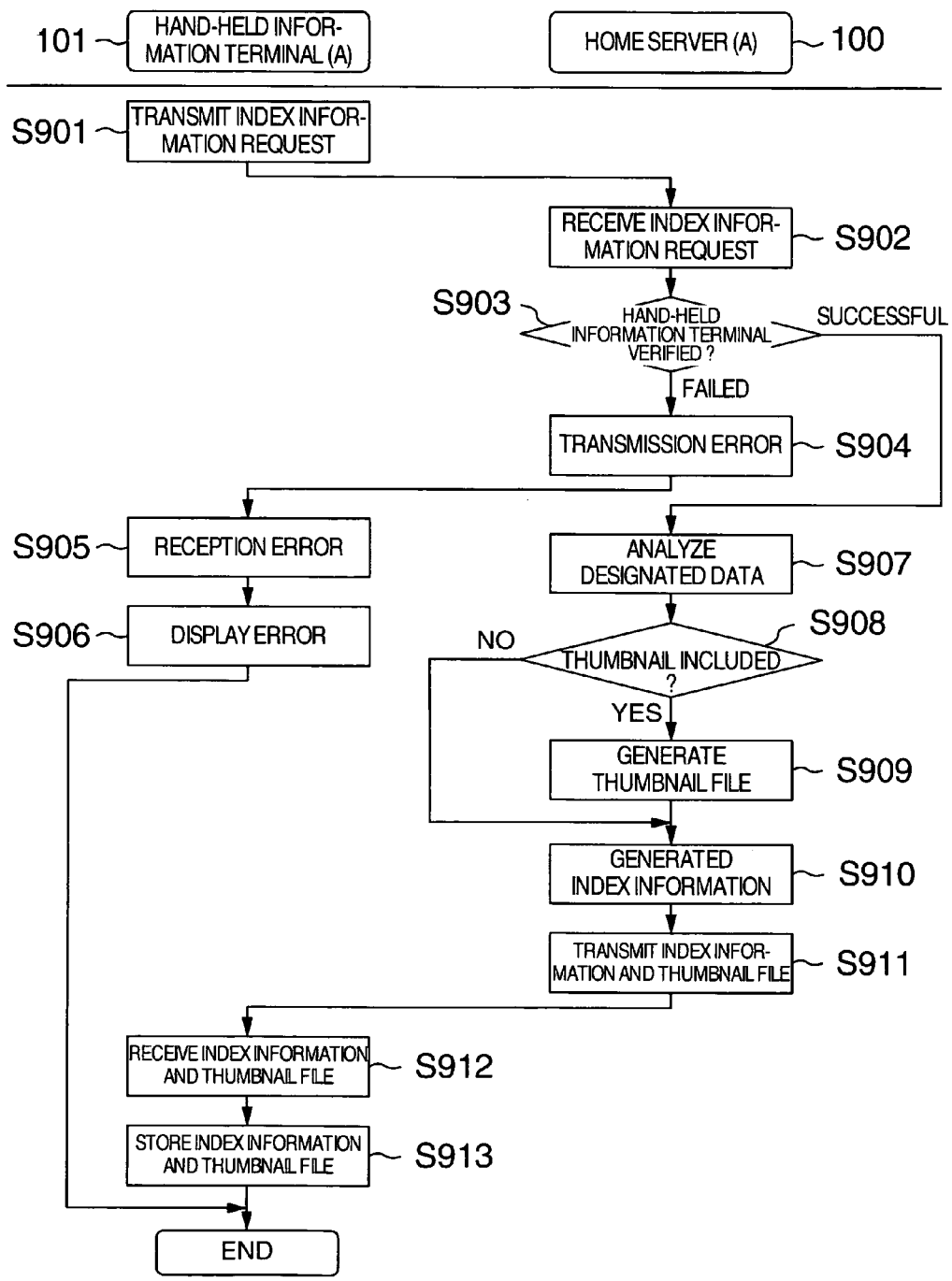

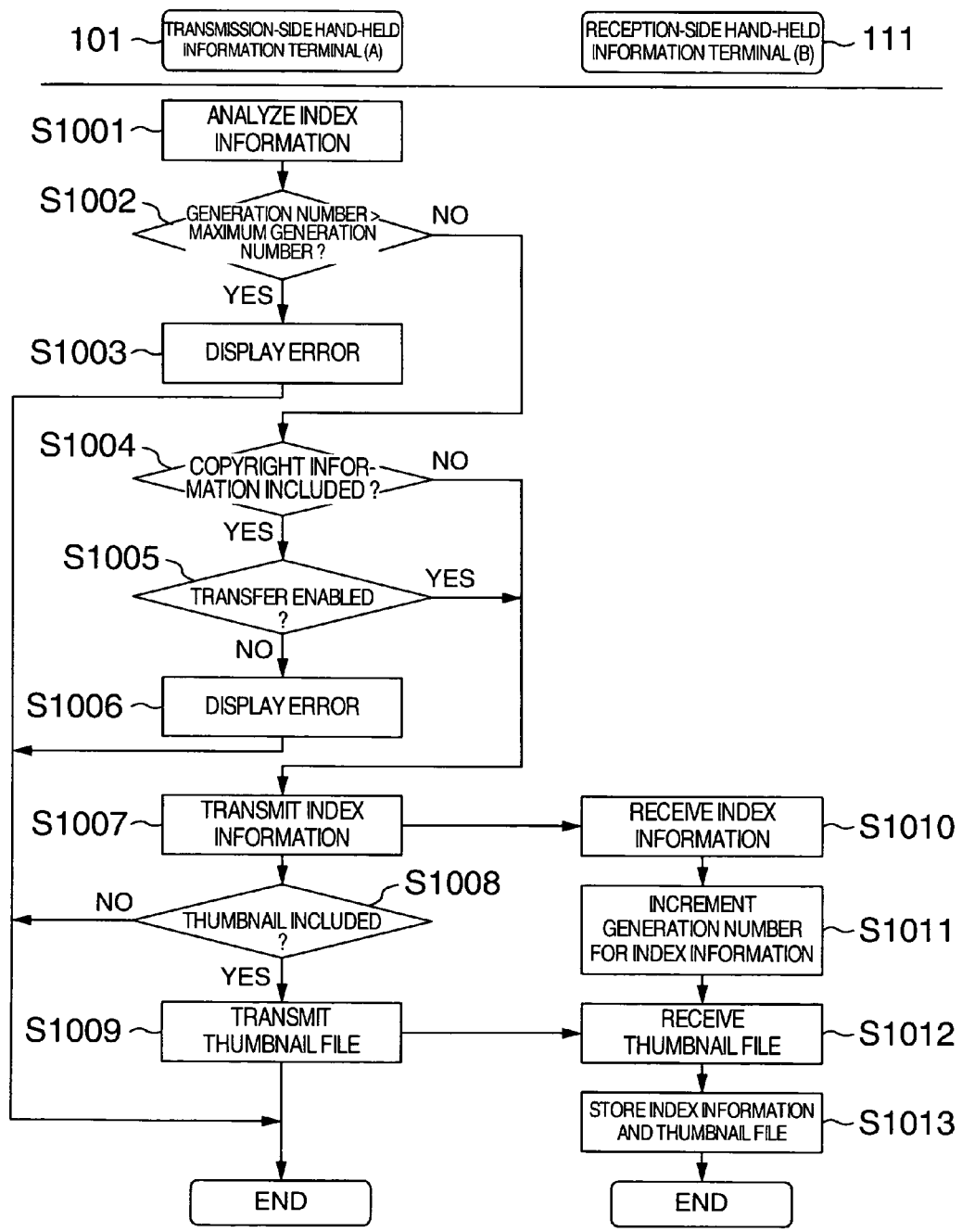

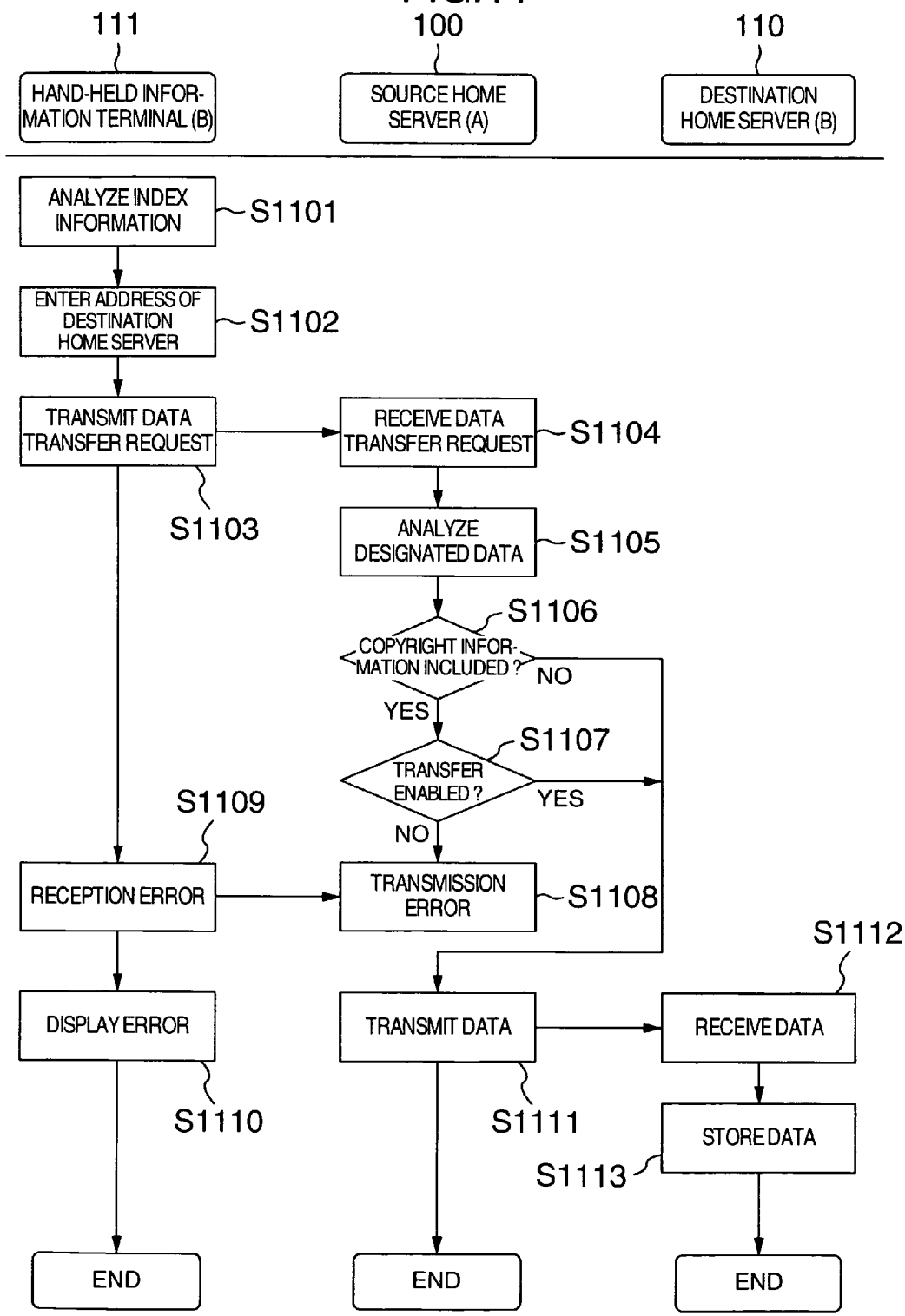

FIG.13

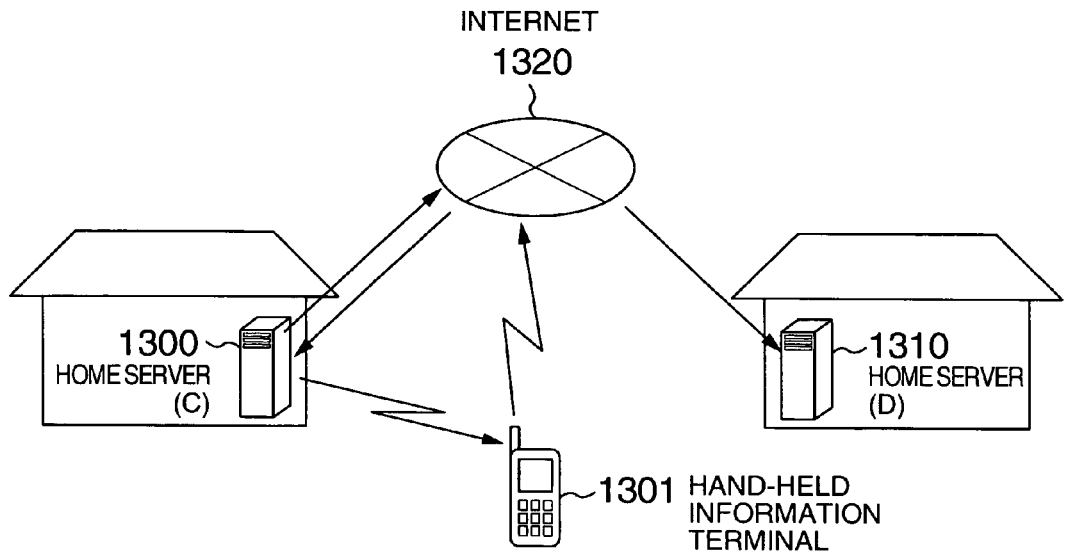

FIG.14

```
<server>123.123.123.123</server>     1401

<list>
   <file ID="001" type="JPEG" copyright="ON" thumbnail="AUTUMN LEAVES_THUMBNAIL.jpg">AUTUMN LEAVES.jpg</file>
   <file ID="002" type="GIF" copyright="OFF"ANIMATION.gif</file>
   <file ID="003" type="MPEG" copyright="ON" thumbnail="ATHLETIC MEET_THUMBNAIL.jpg">ATHLETIC MEET.mpg</file>
   <file ID="004" type="TEXT" copyright="OFF">ReadMe.txt</file>
   <file ID="004" type="PNG" copyright="ON">PORTRAIT.png</file>
</list>
```
1402

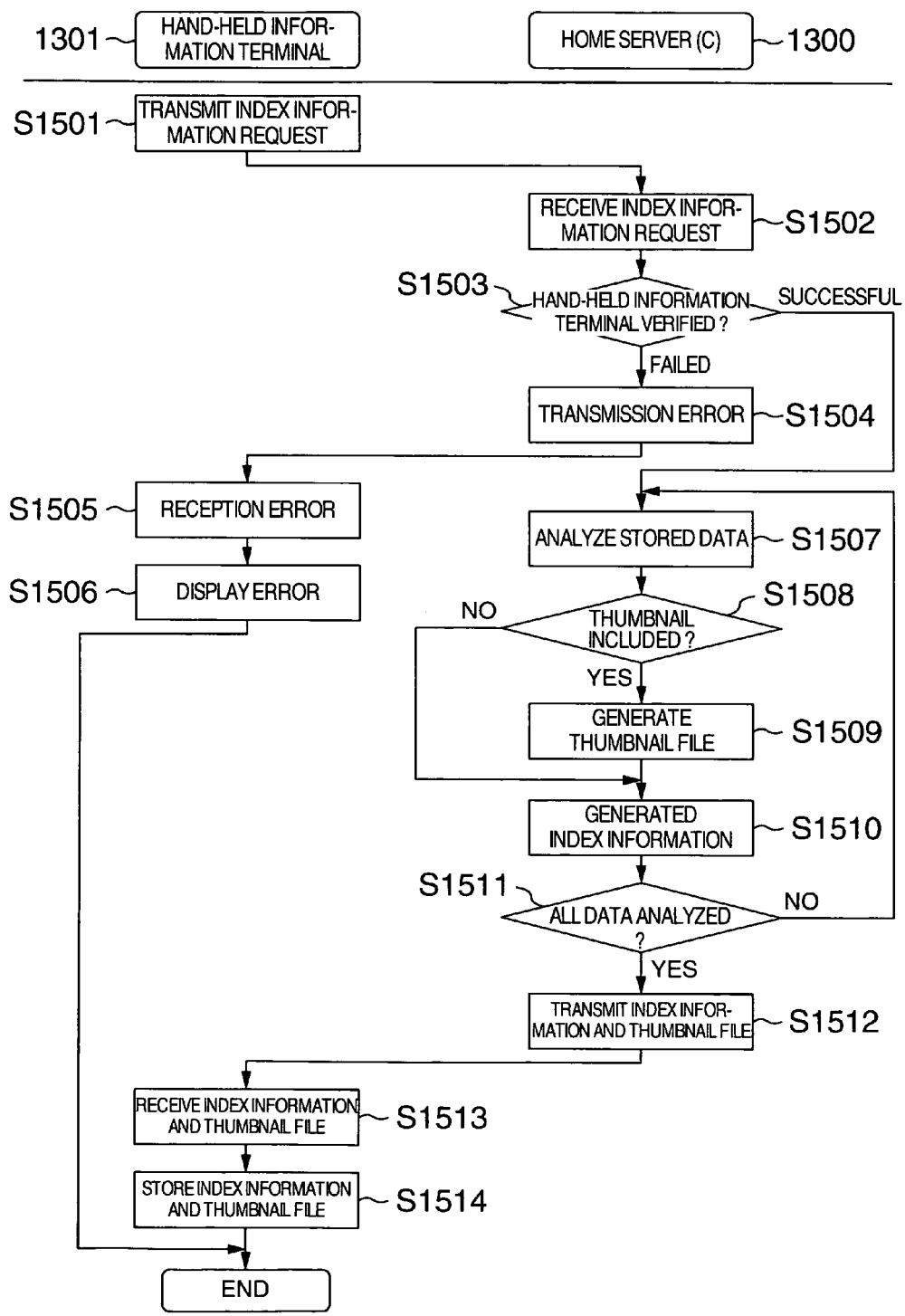

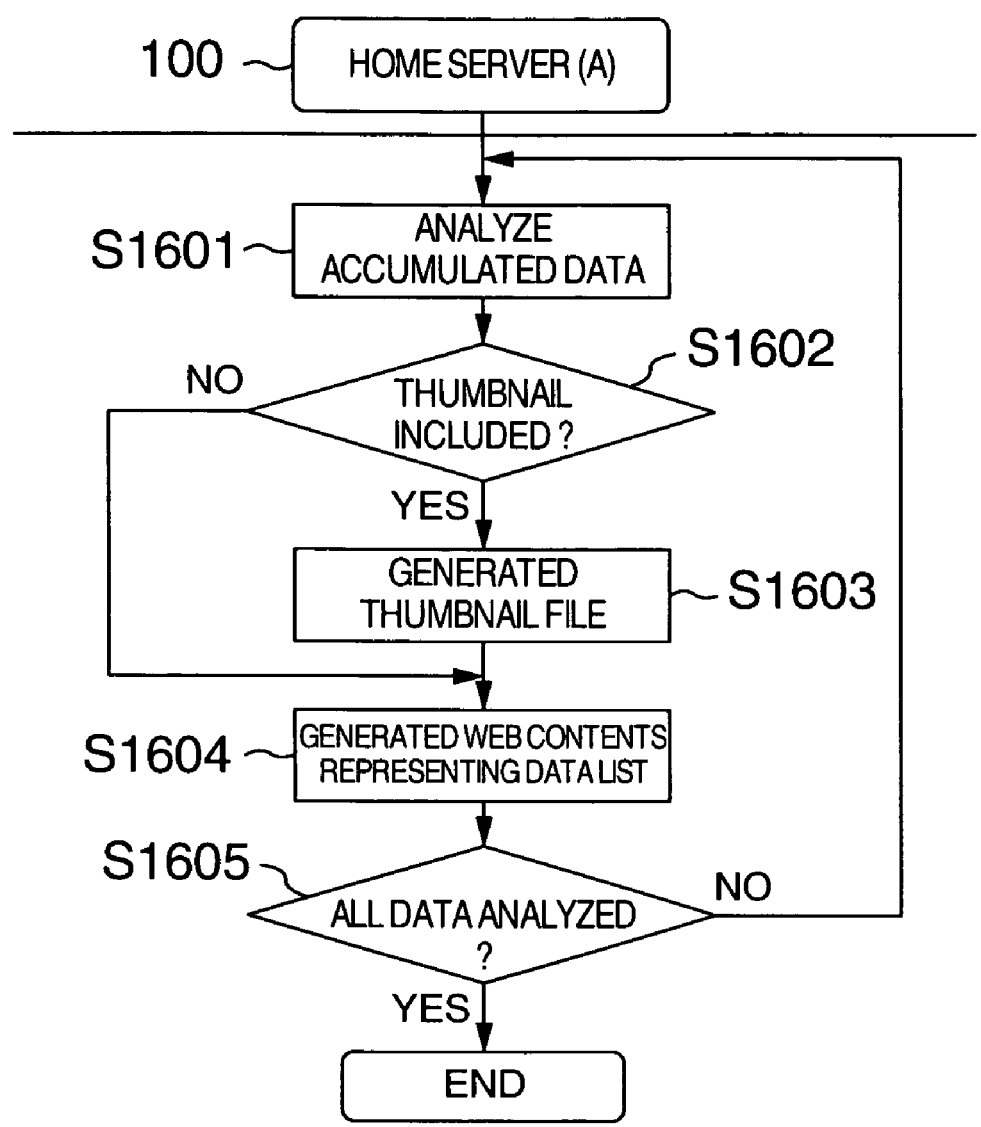

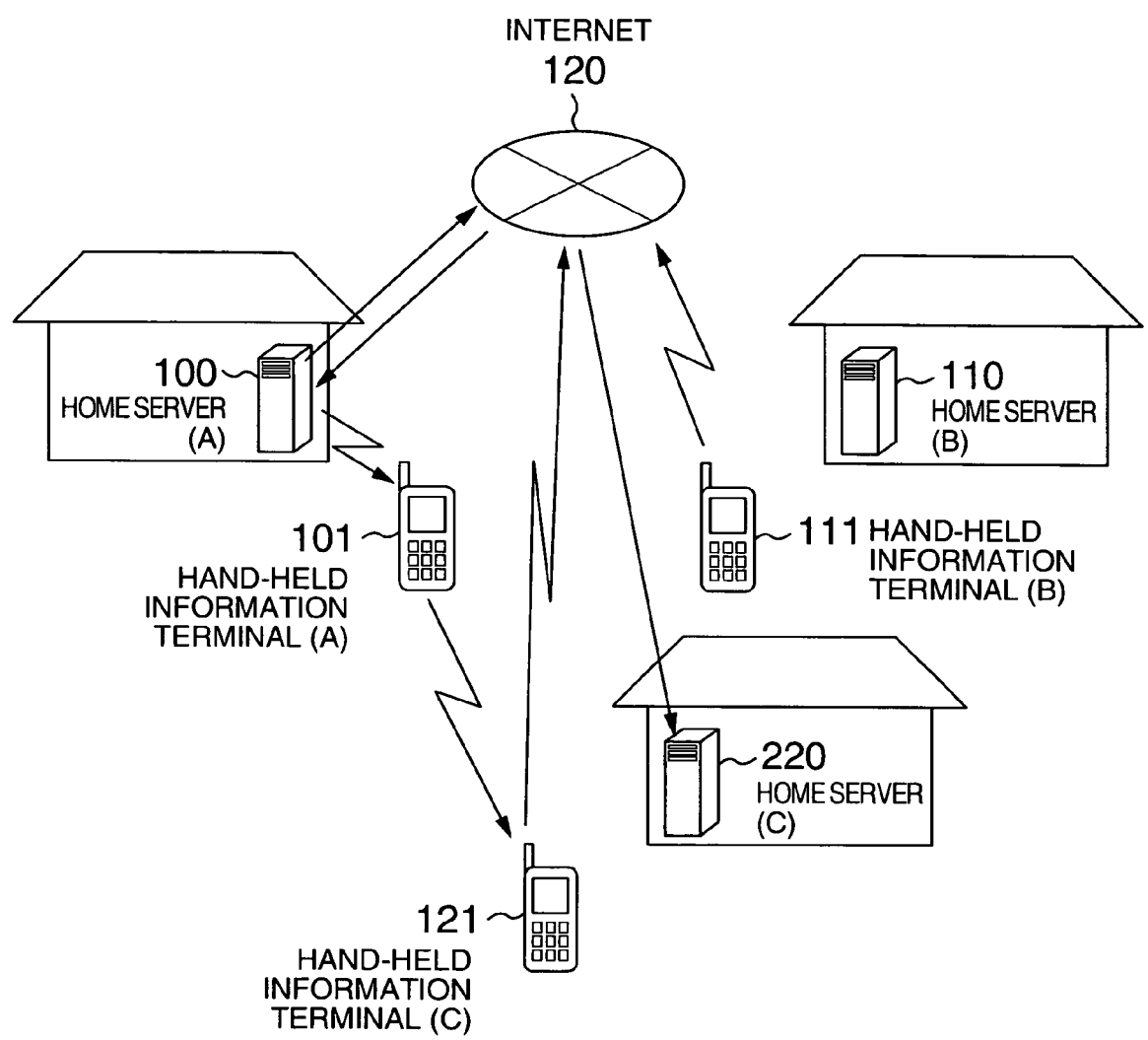

DATA TRANSFER METHOD AND SERVER COMPUTER SYSTEM

INCORPORATION BY REFERENCE

The present application claims priority from Japanese application JP2003-408404 filed on Dec. 8, 2003, the content of which is hereby incorporated by reference into this application.

BACKGROUND OF THE INVENTION

1. Field of the Invention

The present invention relates to a data transfer method for a server computer, and particularly to a data transfer method that uses index information.

2. Description of the Related Art

Generally, hand-held information terminals are inferior to server computers in their storage device capacities and in their processing capabilities as controllers. Therefore, a hand-held information terminal has been proposed wherein, "in order to improve the efficiency with which data is used by hand-held information terminals, index files, with data, are transmitted by server computers to hand-held information terminals" (e.g., JP-A-2000-215160).

According to the technique described in JP-A-2000-215160, for the transmission of index information to hand-held information terminals, data transmission is performed only between server computers and hand-held information terminals. Thus, conventionally, employing hand-held information terminals for the exchange of data by server computers is difficult. That is, data transfers between server computers must be performed at the locations whereat the server computers are installed.

SUMMARY OF THE INVENTION

In order to resolve this problem, it is one objective of the present invention to provide a data transfer method whereby data transfers between server computers can be performed at locations other than those whereat the server computers are installed.

To achieve this objective, a data transfer method comprises the steps of: transmitting index information, including data identification information and an address, to a first hand-held information terminal by a first server computer;

transmitting the received index information to a second hand-held information terminal by the first hand-held information terminal;

when, based on the received index information, the second hand-held information terminal requests for transferring data to a second server computer, transmitting the data to the second server computer by the first server computer.

According to the present invention, since the index information transfer can be performed between the hand-held information terminals, the transfer of data indicated by the index information can also be performed between the server computers, and thus, the transfer of data between the server computers can be performed at locations other than those whereat the server computers are installed.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing the hardware configuration of the hand-held information terminal according to the first embodiment;

FIG. 6 is a diagram showing index information according to the first embodiment;

FIG. 7 is a diagram showing data list information according to the first embodiment;

FIG. 8 is a flowchart showing the processing performed, according to the first embodiment, upon the reception of a data list request;

FIG. 9 is a flowchart showing the processing performed, according to the first embodiment, upon the reception of an index information request;

FIG. 10 is a flowchart showing the processing performed, according to the first embodiment, for the transfer of index information between hand-held information terminals;

FIG. 11 is a flowchart showing the processing performed, according to the first embodiment, for the transfer of data between home servers;

FIG. 13 is a schematic diagram showing the configuration of a server computer system according to a third embodiment of the present invention;

FIG. 14 is a diagram showing index information according to the third embodiment;

FIG. 15 is a flowchart showing the processing performed, according to the third embodiment, upon the reception of an index information request;

FIG. 16 is a diagram showing a data list analysis according to the first embodiment; and FIG. 17 is a schematic diagram showing an example configuration of a server computer system according to the second embodiment.

DETAILED DESCRIPTION OF THE EMBODIMENTS

The embodiments of the present invention will now be described with reference to the accompanying drawings. In the following embodiments, a home server is employed as an example server computer.

Figure 1:
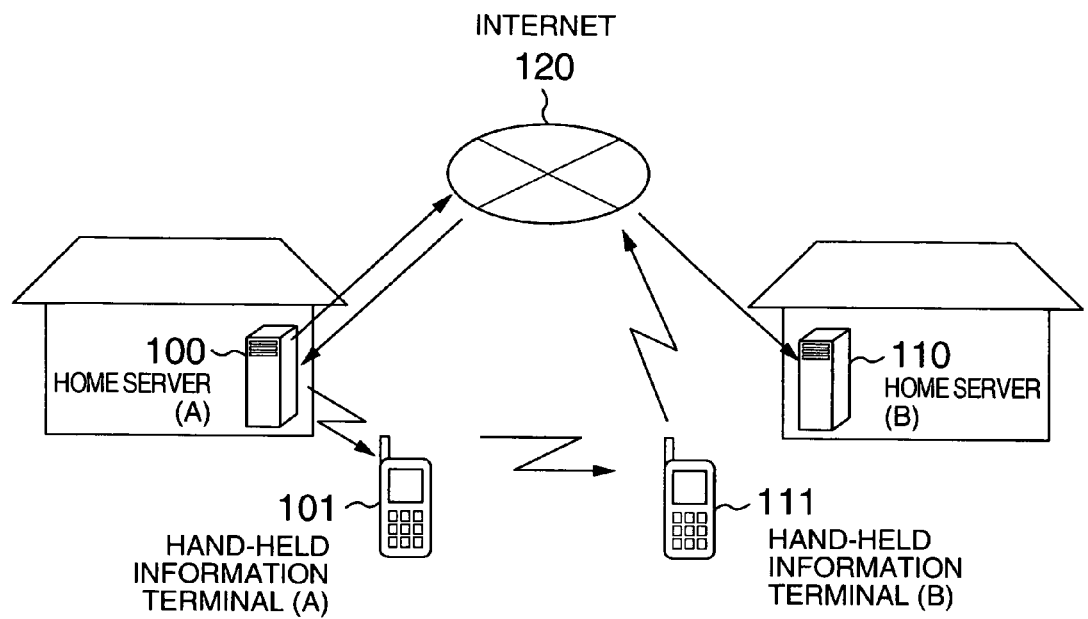
FIG. 1 is a schematic diagram showing the configuration of a server computer system according to a first embodiment of the present invention.

FIG. 1 is a schematic diagram showing the configuration for a first embodiment of the present invention. A reference numeral 100 denotes a home server (A), 101 denoting a hand-held information terminal (A) held by an owner of the home server (A)100, 110 denoting a home server (B) of a data transmission destination, and 111 denoting a hand-held information terminal (B) held by an owner of the home server (B)110. The home server (A)100 and home sever (B)110 are connected to a network such as Internet. Index information is generated for data such as digital contents stored in the home server (B)110, and is transmitted to the hand-held information terminal (A)101 which stores the index information and displays the contents thereof, as required. When the owner of the home server (B)110 desires to obtain the data indicated by the index information displayed on the hand-held information terminal (A)101, the owner requests that the index information is transferred from the hand-held information terminal (A)101 to the hand-held information terminal (B)111.

Based on the received index information, the hand-held information terminal (B)111 requests to the home server (A)100 for the transmission to the home server (B)110, across a network such as the Internet, of the pertinent data indicated by the index information. On receiving the request from the hand-held information terminal (B)111, the home server (A)100 transmits the data, across the network, to the home server (B)110. The home server (B)110 then receives and stores the data transmitted by the home server (A)100.

Figure 2:
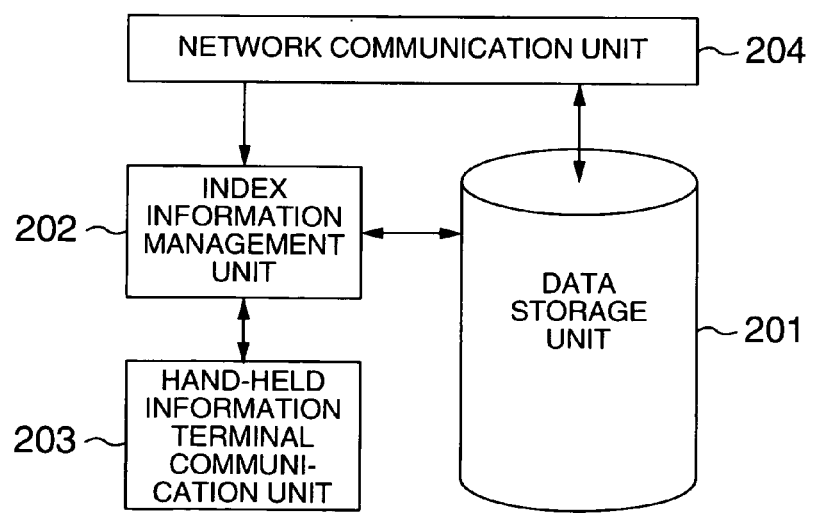
FIG. 2 is a block diagram showing a home server according to the first embodiment.

FIG. 2 is a block diagram showing the home server (A)100. The home server (A)100 includes: a data storage unit 201 for accumulating content data, such as images, moving pictures and music; an index information management unit 202 for generating and managing index information for the data accumulated in the data storage unit 201; a hand-held information terminal communication unit 203 for communicating with a hand-held information terminal via an infrared, wireless or wire network; and a network communication unit 204 for communicating with another device across a network such as the Internet. The home server (B)110, which is the data transfer destination, has the same block configuration, but for the reception of data only, the index information management unit 202 and the hand-held information terminal communication unit 203 may not be provided.

Figure 3:
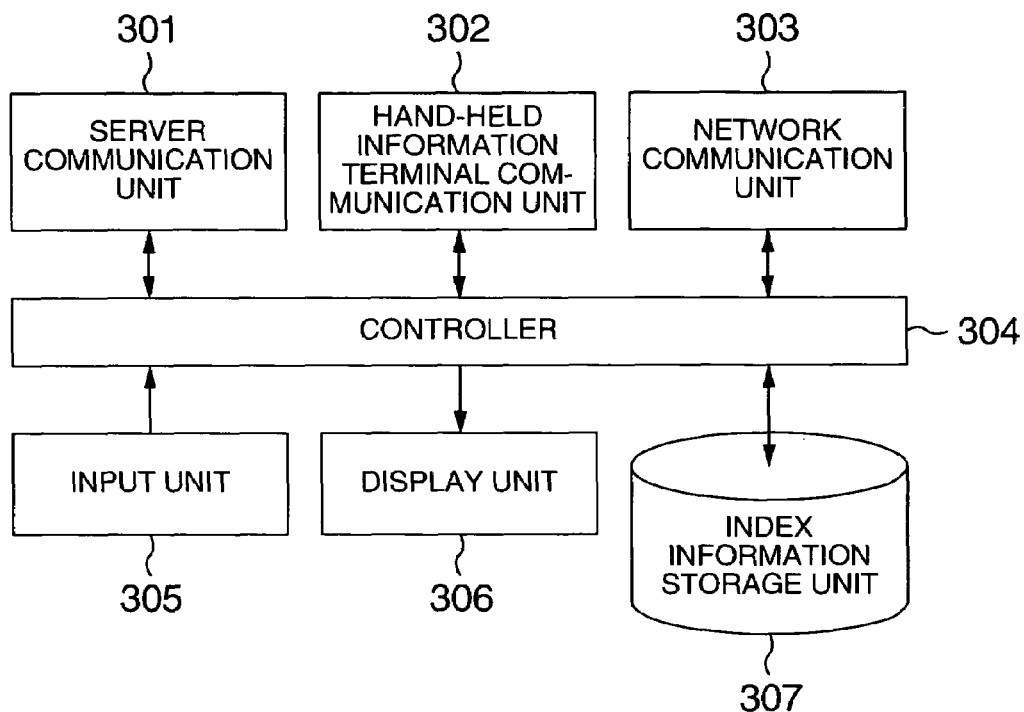
FIG. 3 is a block diagram showing a hand-held information terminal according to the first embodiment.

FIG. 3 is a block diagram showing the hand-held information terminal (A)101. The hand-held information terminal (A)101 includes: a server communication unit 301 for performing communication with the home server (A)100; a hand-held information terminal communication unit 302 for performing communication with another hand-held information terminal; a network communication unit 303 for performing communication with another device such as a home server, across a network such as the Internet; a controller 304 for performing the processing related to the index information and for controlling the entire hand-held information terminal (A)101; an input unit 305 which is a human input interface; an output unit 306 which is a human output interface; and an index information storage unit 307 for storing the index information. The hand-held information terminal (B)111, which is an index information transfer destination, has the same block configuration.

Figure 4:
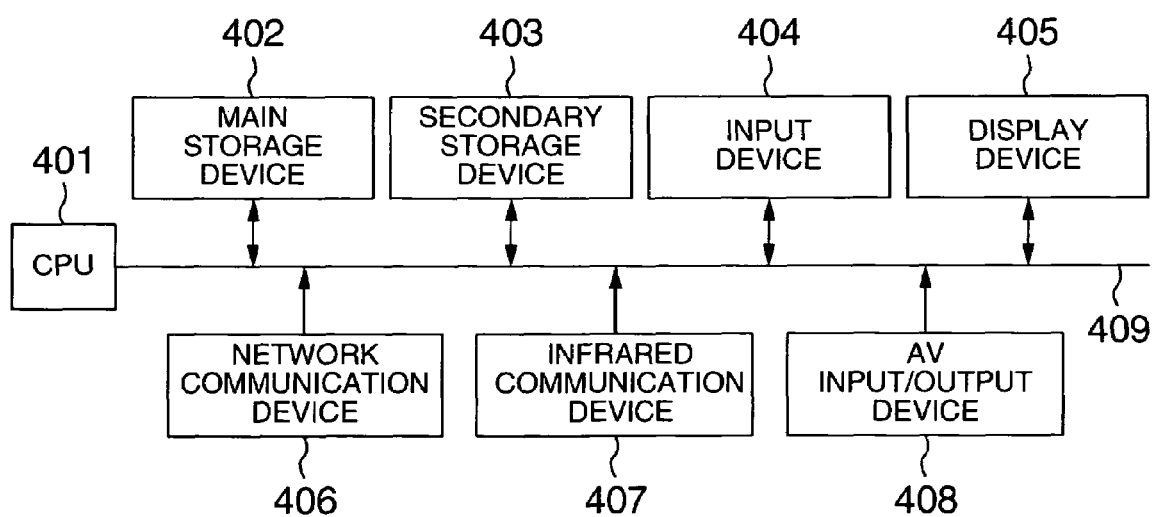
FIG. 4 is a diagram showing the hardware configuration of a home server according to the first embodiment.

FIG. 4 is a diagram showing a hardware configuration for the home server (A)100. A CPU 401 controls the entire home server (A)100 and corresponds to the index information management unit 202 in FIG. 2. A main storage device 402 is used as a work memory for the temporary storage of various data. A secondary storage device 403 is, for example, a hard disk or an external memory device and corresponds to the data storage unit 201 in FIG. 2. An input device 404 is, for example, a keyboard and is used for entering characters or processing commands. A display device 405 is, for example, a CRT, an LCD or an LED and is used for displaying the processing results, error information and the current state. A network communication device 406 for communicating with another device, is connected to a network such as the Internet by a LAN cable, a wireless LAN or a telephone line. The network communication device 406 corresponds to the network communication unit 204 or the hand-held information terminal communication unit 203 in FIG. 2 for communicating with another home server.

An infrared communication device 407, which corresponds to the hand-held information terminal communication unit 203 in FIG. 2, uses infrared to communicate with a hand-held information terminal, which may use wireless or cable communication instead of infrared. An AV input/output device 408 inputs or outputs images and sounds for various contents stored in the data storage unit 201. A bus 409 is provided for the interconnection of these devices. The home server (B)110 has the same hardware configuration, but for the reception of data only, the infrared communication device 407 may not be provided for the home server (B)110. Further, for communication with the hand-held information terminal, instead the infrared communication device 407 being provided, the network communication unit 303 may be employed.

FIG. 5 is a diagram showing the hardware configuration of the hand-held information terminal (A)101. The hardware configuration of the hand-held information terminal (A)101 is substantially the same as that of the home server (A)100 in FIG. 4 with the exception that the portability is taken into account. A CPU 501, which corresponds to the controller 304 in FIG. 3, controls the entire hand-held information terminal (A)101. A main storage device 502 is used as a work memory for the temporary storage of various data. A secondary storage device 503, which corresponds to the index information storage unit 307 in FIG. 3, can be a hard disk, a flash memory or an external memory device, for example, although when the portability is taken into account, the employment of a lightweight device is preferable. An input device 504 such as a button, which corresponds to the input unit 305 in FIG. 3, is used for entering characters and processing commands. A display device 505 such as an LCD or an LED, which corresponds to the display unit 306 in FIG. 3, is used for displaying the processing results, error information and the current state.

A network communication device 506 is connected to a network such as the Internet by a hand-held telephone network, a PHS network or a wireless LAN, and is used to communicate with another device. The network communication device 506 corresponds to the network communication unit 303 or the hand-held information terminal communication unit 302 in FIG. 3, and is used for communicating with a home server across a network. An infrared communication device 507, which corresponds to the server communication unit 301 or the hand-held information terminal communication unit 302 in FIG. 3, uses infrared to communicate with the home server or another hand-held information terminal; however, instead of infrared, wireless or cable communication may be employed, and when the network communication device 506 is employed to perform all communications, the infrared communication device 507 may not be provided. A speech device 508 is used to transmit speech across the hand-held telephone network or the PHS network, but when the hand-held information terminal (A)101 does not have a speech function, the speech device 508 may not be provided. A bus 509 is provided for the interconnection of these devices. The hand-held information terminal (B)111 has the same hardware configuration.

FIG. 6 is a diagram showing example index information for data stored in the home server (A)100 used for the first embodiment. In FIG. 6, an XML form is used for writing the address of the home server (A)100 whereat the data are stored, an index information generation number that is incremented each time index information is transferred, a maximum generation number and information concerning the data. An element 601 encloses an address 602 for a server such as the IP address for the home server (A)100 whereat the data are stored. An element 603 encloses a generation number 604 that is incremented each time, and an index information transfer between hand-held information terminals is performed. An element 605 encloses a maximum generation number 606 for the generation number 604, and is used for limiting the number of times when index information may be transferred from a hand-held information terminal to another terminal. When the number of transfer times for data corresponding to the index information is limited to one, the dissemination of data contrary to the intent of an owner can be prevented. An element 607 encloses a variety of information concerning the data, such as a data identification number 608, a data type 609, copyright information 610, a thumbnail file name 611 and a data name 612. The data name 612 may be either the file name for the data or some other name. The storage location of the data in the home server (A)100 is managed by the home server (A)100 based on the identification number 608. For this management, a unique identification number is allocated for each set of data stored in the home server (A)100, and a correlation table, wherein identification numbers and their respective data storage locations are correlated, is managed by the home server (A)100. As is described above, since the index information includes identification information, such as a data identification number and the Internet address of the home server, the hand-held information terminal can access the home server and designate the data that is to be transferred. The identification information content is not limited to numbers, characters may also be used.

FIG. 7 is a diagram showing example list information for each set of data stored in the home server (A)100. In FIG. 7, the XML form is employed to write the same information as the index information for each set of data.

In this embodiment, before transmitting the index information for the data stored in the home server (A)100 to the hand-held information terminal (A)101, the list of the data stored in the home server (A)100 is displayed by the hand-held information terminal (A)101 so that desired data may be designated. For this data designation, the hand-held information terminal (A)101 must first obtain the list of data stored in the home server (A)100. FIG. 8 is a flowchart showing the sequential processing performed by the hand-held information terminal (A)101 when requesting, from the home server (A)100, the list of data shown in FIG. 7. When the user employs the input unit 305 of the hand-held information (A)101 to enter a data list request, or when a system, for example, issues a data list request, the controller 304 generates a data list request command for the data list request and the server communication unit 301 transmits the data list request command to the home server (A)100 (step S801). When the hand-held information terminal communication unit 203 of the home server (A)100 receives the data list request command (step S802), the data stored in the data storage unit 201 of the home server (A)100 are analyzed (step S803). During the data analysis process at step S803, a variety of information concerning the data, such as the data identification number, the data type and copyright information, is analyzed. When the data are image data, a check is performed to determine whether a thumbnail is included, because a thumbnail is sometimes included in image data (step S804). When a thumbnail is included in the data, only the thumbnail is extracted from the data and a thumbnail file is generated (step S805).

When it is determined at step S804 that a thumbnail is not included in the data, or when a thumbnail file is generated at step S805, the data list information shown in FIG. 7 is generated, based on the data information analyzed at step S802 and the thumbnail file name generated at step S805 (step S806). A check is then performed to determine whether all the data stored in the data storage unit 201 of the home server (A)100 have been analyzed (step S807). When there are data that have not yet been analyzed, program control returns to step S803 and the above described processing is repeated, and a variety of data information is added to the data list information. When all the data have been analyzed, the data list information is transmitted by the hand-held information terminal communication unit 203 to the hand-held information terminal (A)101 (step S808). When a thumbnail file has been generated at step S805, this file is also transmitted at step S808. When the server communication unit 301 of the hand-held information terminal (A)101 receives the data list information and the thumbnail file transmitted at step S808 (step S809), the received data list information is analyzed (step S810) to determine whether a thumbnail has been included (step S811). When a thumbnail has not been included, the data list information is displayed on the display unit 306 (step S812); however, all the information may not be displayed, only the data names. When a thumbnail is included at step S811, both the data list information and the thumbnail are displayed on the display unit (step S813).

In this embodiment, through the processing in FIG. 8, the list of the data stored in the home server (A)100 is displayed by the hand-held information terminal (A)101. However, the data list may be created as web contents by the home server (A)100, and the web contents may be displayed using the browser of the hand-held information terminal (A)101. FIG. 16 is a flowchart showing the processing for creating web contents representing the list of data stored in the home server (A)100. First, data stored in the data storage unit 201 of the home server (A)100 is analyzed (step S1601). During the data analysis process at step S1601, a variety of information concerning the data, such as the data identification number, the data type and copyright information, is analyzed. When the data is image data, because a thumbnail is sometimes included in such data, a check is performed to determine whether there is an included thumbnail (step S1602). When a thumbnail is included in the data, only the thumbnail is extracted from the data and a thumbnail file is generated (step S1603). When at step S1602 the data did not include a thumbnail, or when a thumbnail file was generated at step S1603, web contents data, which represent the data list information and which are written in the HTML form, are generated based on the variety of information concerning the data analyzed at step S1601 and the thumbnail file name generated at step S1603 (step S1604). Then, a check is performed to determine whether all the data stored in the data storage unit 201 of the home server (A)100 have been analyzed (step S1605). When there are data that have not yet been analyzed, program control returns to step S1601, the above processing is repeated, and a variety of information concerning the data is added to the data list web contents. When all the data have been analyzed, this processing is terminated. The web contents obtained through the processing are then opened to the public on the Internet, so that the hand-held information terminal (A)101 can access the data and display the data list.

As is described above, since the data list need not be transmitted to the hand-held information terminal, both the communication fees and the processes performed between the home server (A)100 and the hand-held information terminal (A)101 can be reduced.

When the user has selected desired data using the data list shown in the web contents, only the index information that has been designated may be transmitted. With this arrangement, both the amount of data to be transmitted and the load imposed on the memory of the hand-held information terminal (A)101 can be reduced.

In the first embodiment, desired data in the list of the data stored in the home server (A)100 are designated and displayed, through the performance of the processes shown in FIGS. 8 and 9, by the hand-held information terminal (A)101, and the index information for the desired data is stored in the hand-held information terminal (A)101. FIG. 9 is a flowchart showing the process sequence performed when the hand-held information terminal (A)101 transmits a request to the home server (A)100 for the transmission of index information for the designated data shown in FIG. 6. The user employs the input unit 305 to designate desired data on the data list that is displayed, through the processing shown in FIG. 8, by the hand-held information terminal (A)101. As a specific example, the user moves a cursor across the data list displayed on the display unit 306, selects desired data, and depresses a button. When data is thus designated by the user using the input unit 305, the hand-held information terminal (A)101 generates an index information request command for the designated data, and the server communication unit 301 transmits the index information request command to the home server (A)100 (step S901). In this case, the index information request command includes the data identification number shown on the data list in FIG. 7 and the identification number for the hand-held information terminal (A)101. When the hand-held information terminal communication unit 203 of the home server (A)100 receives the index information request command transmitted at step S801 (step S902), device verification is performed based on the identification information that is included for the hand-held information terminal (A)101 (step S903). For the device verification, identification information for the hand-held information terminal (A)101 must be registered in advance with the home server (A)100. When the device verification fails at step S903, the hand-held information terminal communication unit 203 transmits an error message to the hand-held information terminal (A)101 indicating the device verification failed (step S904).

When the server communication unit 301 of the hand-held information terminal (A)101 receives the error message transmitted by the home server (A)100 at step S904 (step S905), a message indicating that the device verification has failed is displayed on the display unit 306 (step S906) and the process sequence is thereafter terminated. When the device verification is successful at step S903, the data stored in the data storage unit 201 is selected based on the identification number for the designated data included in the index information request command and the data is analyzed (step S907). During the data analysis process at step S907, a variety of information concerning the data, such as the data identification number, the data type and copyright information, is analyzed. When the data is image data, a check is performed to determine whether a thumbnail is included, because a thumbnail is sometimes included in image data (step S908). When a thumbnail is included in the image data, only the thumbnail is extracted from the data and a thumbnail file is generated (step S909). When at step S908 a thumbnail was not included in the data, or when a thumbnail file is generated at step S909, index information as shown in FIG. 6 is generated based on the information for the data analyzed at step S907, the thumbnail file name generated at step S909 and an address, such as the IP address of the home server (A)100, indicating the location of the server (step S910). For the index information, at step S910, an initial value of "0" is set as a generation number representing the number of times an index information transfer between the hand-held terminals has been performed, and a pre-designated maximum generation number is designated. Thereafter, the index information generated at step S910 is transmitted by the hand-held information terminal communication unit 203 to the hand-held information terminal (A)101 (step S911).

When a thumbnail file was generated at step S901, this thumbnail file is also transmitted at step S911. When the server communication unit 301 of the hand-held information terminal (A)101 receives the index information and the thumbnail file transmitted at step S911 (step S912), the index information and the thumbnail file are stored in the index information storage unit 307 (step S913) and the process sequence is thereafter terminated.

In this embodiment, the user determines whether the index information for all the data stored in the home server (A)100 should be transferred to the hand-held information terminal (A)101. Therefore, only the index information for the data that the user determines is necessary must be transferred. For the transmission of the index information for all the data stored in the home server (A)100, only the processing shown in FIG. 9 need be performed for all the data.

In this embodiment, through the performance of the processing in FIG. 9, instead of the main body of the data, only the index information and the thumbnail file, which has a small data size, are stored in the hand-held information terminal (A)101, so that the data can be carried easily without posing a threat to the memory capacity of the hand-held information terminal.

An explanation will now be given for the processing performed to transfer the index information stored in the hand-held information terminal to another hand-held information terminal. The index information and the thumbnail stored in the hand-held information terminal by performing the processing shown in FIG. 9 are displayed on the display unit 306. Not all the index information need be displayed; only data names or thumbnails may be displayed. At this time, it is preferable that the names of data for which copyright information has been provided be displayed, for example, in different colors, so that the user can easily identify them. The user employs the input unit 305 to designate the displayed data to be transmitted; specifically, based on a plurality of sets of index information and thumbnails displayed on the display unit 306, the user moves the cursor and selects desired data by depressing a button. FIG. 10 is a flowchart showing the process sequence for transmitting index information for the selected data from the hand-held information terminal (A)101 to the hand-held information terminal (B)111. The hand-held information terminal (A)101, which is the index information transmission side, analyzes the index information for the designated data (step S1001). During the analysis process at step S1001, the generation number for the index file and the maximum generation number are obtained, and whether copyright information and a thumbnail file are available for the data is determined. Then, a check is performed to determine whether the generation number for the index information is greater than the maximum generation number (step S1002). When the generation number is greater, it is assumed that the index information can not be transferred, and an error message to this effect is displayed on the display unit 306 of the hand-held information terminal (A)101 (step S1003). The process sequence is thereafter terminated.

When the generation number is not greater than the maximum generation number at step S1002, a check is performed to determine whether copyright information is included in the index information (step S1004). When copyright information is included, a check is performed to determine whether the transfer of the data indicated by the index information is permitted (step S1005). When it is determined at step S1005 that the transfer of the data is inhibited, an error message indicating that the transfer of the data is inhibited is displayed on the display unit 306 of the hand-held information terminal (A)101 (step S1006). The process sequence is thereafter terminated. When it is determined at step S1005 that the transfer of the data is permitted, or when copyright information that inhibits a data transfer is not included at step S1004, the index information is transmitted by the hand-held information terminal communication unit 302 of the hand-held information terminal (A)101 to the hand-held information terminal (B)111 (step S1007). Further, a check is performed to determine whether a thumbnail file is included in the index information (step S1008). When a thumbnail file is included, the thumbnail file is also transmitted to the hand-held information terminal (B)111 (step S1009). When the hand-held information terminal communication unit 302 of the hand-held information terminal (B)111 receives the index information transmitted by the hand-held information terminal (A)101 at step S1007 (step S1010), the generation number for the received index information is incremented by one (step S1011). And when the thumbnail file is transmitted by the hand-held information terminal (A)101 at step S1009, the hand-held information terminal communication unit 302 of the hand-held information terminal (B)111 also receives this thumbnail file (step S1012). Then, the thus received index information and thumbnail file are stored in the index information storage unit 307 of the hand-held information terminal (B)111 (step S1013). The process sequence is thereafter terminated.

An explanation will now be given for the process sequence for the issue, by the hand-held information terminal (B)111, of a request to the home server (A)100 for a data transfer to the home server (B)110, and for the transfer of the data by the home server (A)100. FIG. 11 is a flowchart showing the process sequence according to the embodiment for the transmission, by the hand-held information terminal (B)111, of a request to the home server (A)100 for a data transfer to the home server (B)110, and for the transfer of the data to the home server (B)110. The hand-held information terminal (B)111 analyzes the index information immediately after obtaining it through the processing in FIG. 10 (step S1101). In the process performed at step S1101 for analyzing the index information, an address such as an IP address, which indicates the location of the home server (A)100, and information such as a data identification number are obtained from the index information. Then, an address, such as an IP address, indicating the location of the home server (B)110, which is the data transfer destination, is entered using the input unit 305 (step S1102). The address of the home server (B)110 may be registered in advance with the hand-held information terminal (B)111, and the process at step S1102 can be eliminated. Following this, a data transfer request command, which includes the data identification number obtained at step S1101 and the address of the home server (B)110 entered at step S1102, is generated and is transmitted by the network communication unit 303 to the address of the home server (A)100 using TCP/IP, for example (step S1103). The network communication unit 204 of the home server (A)100 receives the data transfer request command across a network such as the Internet (step S1104). Based on the data identification number included in the received data transfer request command, data stored in the data storage unit 201 of the home server (A)100 is selected and is analyzed (step S1105). A check is performed to determine whether copyright information is included in the data (step S1106). When copyright information is included, a check is performed to determine whether the transfer of the data is permitted (step S1107).

When it is determined at step S1107 that the transfer of the data is inhibited, an error message indicating the transfer of the data is inhibited is transmitted by the network communication unit 204 of the home server (A)100 to the hand-held information terminal (B)111 (step S1108). When the network communication unit 303 of the hand-held information terminal (B)111 receives the error message transmitted by the home server (A)100 at step S1108 (step S1109), an error message indicating that the transfer of the data is inhibited is displayed on the display unit 306 (step S1110). The process sequence is thereafter terminated. When copyright information for inhibiting the data transfer is not included at step S1106, or when it is determined at step S1107 that the transfer of the data is permitted, the network communication unit 204 of the home server (A)100 employs TCP/IP, for example, to transmit the data to the address of the home server (B)110 that is included in the data transfer request command received at step S1104 (step S1111). When the network communication unit 204 of the home server (B)110 receives the data across a network such as the Internet (step S1112), the received data is stored in the data storage unit 201 of the home server (B)110 (step S1113). The process sequence is thereafter terminated.

According to this embodiment, the transfer of index information need only be performed between the hand-held information terminals, so that the transfer of data indicated by the index information can also be performed between the home servers. As a result, the transfer of data between the servers can be performed even at locations, away from home, other than those whereat the servers are installed.

Furthermore, when the hand-held information terminals are carried, persons engaged in a data transfer can employ the hand-held information terminals to confirm, in person, that the data transfer has been completed. In this case, since the persons concerned confirmed, in person, that the data transfer was completed, they are free from anxiety.

Further, since according to the embodiment only the thumbnail and a small amount of the index information can be provided for a hand-held information terminal to handle, a large quantity of data need not be stored in the hand-held information terminal, and this saves on the use of the memory capacity in the hand-held information terminal. In addition, costs incurred for communication between the server and the hand-held information terminal and between the hand-held information terminals can be reduced.

Moreover, according to the embodiment, the number of times transfers of index information are performed between hand-held information terminals can be limited, and in addition to imposing a limit on the number of times data can be copied, the repetitive copying of index information can be prevented.

For the inter-server data transfer system according to the embodiment, data storage locations in the home server are correlated using an identification number; however, data storage location information may be included in the index information. When, for example, the home server file system has a directory structure, an absolute path from the root directory of a data file, or a relative path from the current directory, may be included in the index information. With this arrangement, the home server need not manage data identification numbers.

According to the inter-server data transfer system for this embodiment, a thumbnail file for an image is created only when the original image includes a thumbnail. However, for an image that does not include a thumbnail, a thumbnail file may be prepared by reducing the size of this image, and for a moving image, a thumbnail file may be prepared by reducing the size of the first picture of the moving image. When the moving image conforms to the MPEG system, the first I picture may be extracted and downsized to prepare a thumbnail file. It is preferable that a thumbnail file of a size that can even be displayed by a hand-held information terminal be prepared while taking the display capability of hand-held information terminals into account. With this arrangement, the thumbnail for another image or another moving picture can be displayed.

Further, according to the inter-server data transfer system of the embodiment, in the process in FIG. 10 for the transfer of the index information between the hand-held information terminals, the index information is stored in the index information storage unit of the hand-held information terminal on the reception side. However, instead of storing the index information, the inter-server data transfer process shown in FIG. 11 may be immediately performed. As a result, even when the designation of the number of generations and the maximum number of generations and the determination process at step S1002 in FIG. 10 are eliminated, the repetitive copying of the index information can be prevented.

In the above embodiment, all the data have been analyzed; however, only data in an area designated by the hand-held information terminal may be analyzed. With this arrangement, the load imposed on the home server can be reduced.

In FIG. 1, one home server is employed as the data transfer destination, and the owner of the home server carries one hand-held information terminal. However, a plurality of home servers may be employed, and a plurality of hand-held information terminals may be carried. This example will be described while referring to FIG. 17. FIG. 17 is a diagram showing the configuration of a server computer according to a second embodiment of the present invention wherein a hand-held information terminal (C)121 and a home server (C)220 are additionally provided for the system shown in FIG. 1.

In the second embodiment, a hand-held information terminal (A)101 has already transmitted index information to a hand-held information terminal (B)111, and thereafter, transmits the stored index information to the hand-held information terminal (C)121. Upon receiving the index information, the hand-held information terminal (C)121 issues a request for the transmission of data by a home server (A)100 to the home server (C)220. In this manner, the data transfer can easily be performed. In this embodiment, since the index information has already been provided for the hand-held information terminal (A)101, the request for the further transmission of the index information need not be issued to the home server (A)100.

The second embodiment is substantially the same as the first embodiment, except for the timing for the preparation of the index information, the thumbnail file and the data list information. According to the first embodiment, as is shown in FIG. 8, when a data list request command is transmitted by the hand-held information terminal to the home server, the thumbnail file and the data list information for the data stored in the home server are generated. Further, according to the first embodiment, as is shown in FIG. 9, when an index information request command is transmitted by the hand-held information terminal to the home server, the thumbnail file and the index information for the data stored in the home server are generated. Whereas, according to the second embodiment, each time data are stored in the data storage unit 201 of the home server, index information for the pertinent data is generated, when the data represents an image or a moving picture, as in the first embodiment, a thumbnail file is also generated, together with the index information. The data list information is newly created the first time data is stored in the data storage unit 201, and thereafter, each time data is stored, information for the stored data is added to the data list information that has been generated. When data is deleted from the data storage unit 201 of the home server, the index information for the pertinent data is also deleted each time, and when a thumbnail file has been provided for the deleted index information, the thumbnail file is also deleted and information for the deleted data is erased from the data list information.

Figure 12:
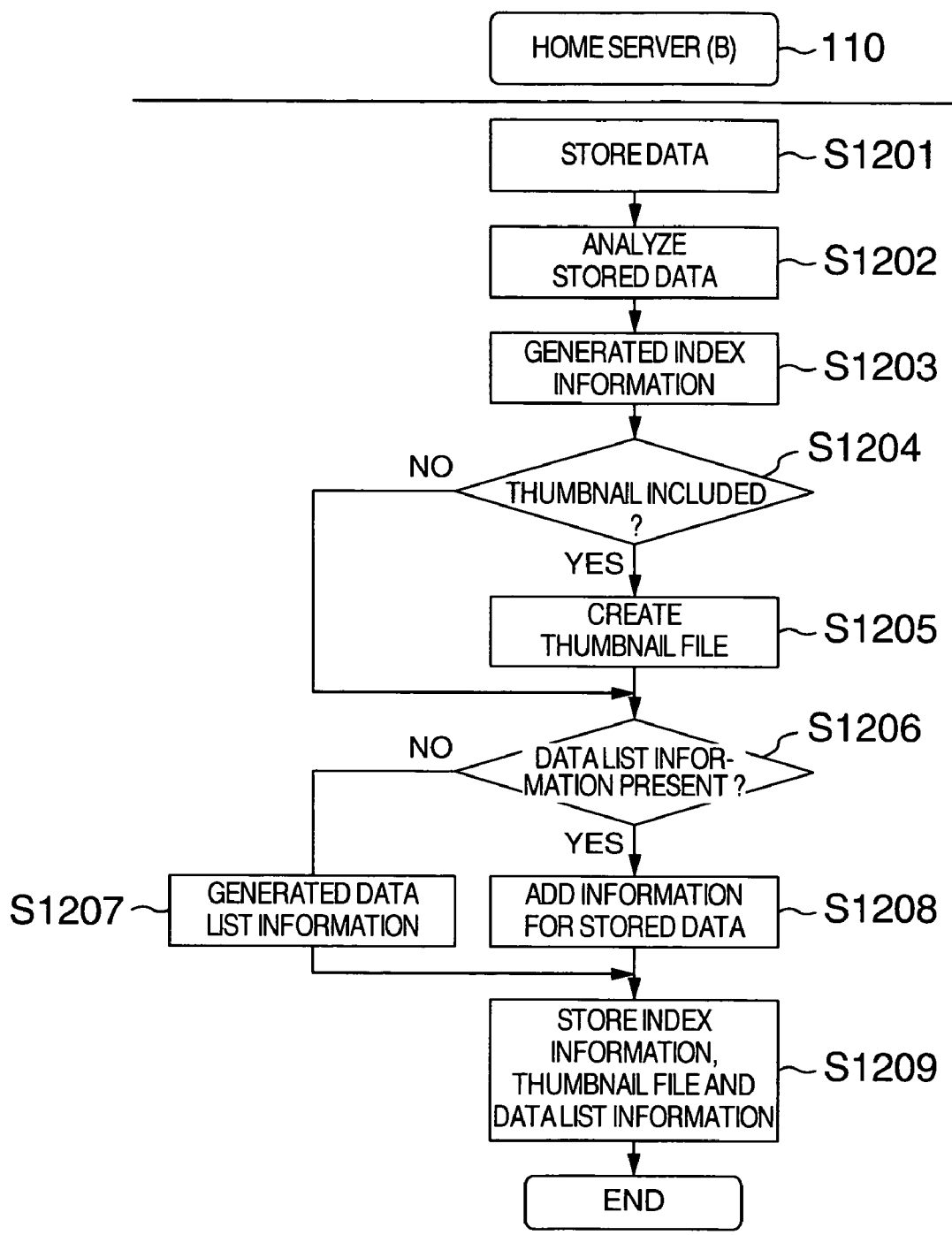
FIG. 12 is a flowchart showing the processing performed, according to a second embodiment of the present invention, to generate index information, a thumbnail file and data list information.

FIG. 12 is a flowchart showing the processing performed for the second embodiment when data is stored in a data storage unit 201 of a home server (B)110. When data is stored in the data storage unit 201 of the home server (B)110 (step S1201), the data is analyzed (step S1202) and the index information shown in FIG. 6 is generated for the data (step S1203). Then, a check is performed to determine whether the stored data includes a thumbnail (step S1204). When a thumbnail is included, a thumbnail file is created (step S1205). Thereafter, a check is performed to determine whether data list information has already been prepared (step S1206). When data list information is not present, the data list information shown in FIG. 7 is generated (step S1207). When at step S1206 data list information is present, information for the data indicated by the data list information is additionally provided (step S1208). Thereafter, the index information, the thumbnail file and the data list information that have been generated are stored in the data storage unit 201 (step S1209) and the processing is terminated.

According to the second embodiment, steps S803 to S807 in the processing in FIG. 8 and steps S907 to S910 in the processing in FIG. 9 can be eliminated. Therefore, the preparation of the data list information, the index information and the thumbnail file is not required each time a data list request and an index information request is received, and the load imposed on the home server can be reduced.

The second embodiment is substantially the same as the first embodiment, with the exception that the components of the inter-server data transfer system are slightly different. For the first embodiment, as is shown in FIG. 1, two hand-held information terminals are employed: the hand-held information terminal of the owner of the home server at the data transfer source and the hand-held information terminal of the owner of the home server at the data transfer destination. However, for the second embodiment, only the hand-held information terminal of the owner of the home server at the data transfer source is employed.

FIG. 13 is a schematic diagram showing the configuration of a server computer system according to a third embodiment. A home server (C)1300 is the same as the home server (A)100 in the first embodiment, a hand-held information terminal (C)1301 is the same as the hand-held information terminal (A)101 in the first embodiment, a home server (D)1310 is the same as the home server (B)110 in the first embodiment, and the Internet 1320 is the same as the Internet 120 in the first embodiment.

Index information for the third embodiment is prepared by combining the index information in FIG. 6 and the data list information in FIG. 7 for the first embodiment. Example index information used for this embodiment is shown in FIG. 14. As the index information in FIG. 14, an address 1401 that indicates the location, such as the IP address, of the home server (C)1300 whereat the data are stored and information 1402 concerning all the data that are stored in a data storage unit 201 of the home server (C)1300 are written in the XML form. The information 1402 for the data is the same as that included in the index information for the first embodiment.

In the third embodiment, first, the hand-held information terminal (C)1301 transfers index information for the data stored in the home server (C)1300. This processing is shown in a flowchart in FIG. 15. The processing in FIG. 15 is substantially the same as the processing in FIG. 9 for the first embodiment, with the exception that the process for generating index information is slightly different. Upon receiving a user entry through an input unit 305, or a request from the system, the hand-held information terminal (C)1301 generates an index information request command and a server communication unit 301 transmits the index information request command to the home server (C)1300 (step S1501). It should be noted that the index information request command includes identification information for the hand-held information terminal (C)1301. When the home server (C)1300 receives the index information request command issued at step S1501 (step S1502), the home server (C)1300 performs a device verification based on the identification information for the hand-held information terminal (C)1301 that is included in the received index information request command (step S1503). In this case, for the device verification, the identification information for the hand-held information terminal (C)1301 should be registered in advance with the home server (C)1300.

When the device verification fails at step S1503, a hand-held information terminal communication unit 203 transmits to the hand-held information terminal (C)1301 an error message indicating the device verification has failed (step S1504). The server communication unit 301 of the hand-held information terminal (C)1301 receives the error message output by the home server 1300 at step S1504 (step S1505), and a message indicating the device verification failed is displayed on a display unit 306 (step S1506). The process sequence is thereafter terminated. When the device verification is successful at step S1503, the data stored in the data storage unit 201 is analyzed (step S1507). In the data analysis process at step S1507, a variety of information for the data, such as the identification number and the type of data, and the presence/absence of copyright information is analyzed. And when the data is image data, a check is performed to determine whether a thumbnail is included in the data, because some image data includes a thumbnail (step S1508). When a thumbnail is included, only the thumbnail portion is extracted from the data, and a thumbnail file is created (step S1509). When a thumbnail is not included in the data at step S1508, or when a thumbnail file is created at step S1509, the index information shown in FIG. 15 is prepared based on the information obtained by the data analysis at step S1507, the name of the thumbnail file prepared at step S1509 and the address, such as the IP address, indicating the location of the home server (C)1300 (step S1510). Then, a check is performed to determine whether all the data stored in the data storage unit 201 of the home server (C)1300 have been analyzed (step S1511). When there are unprocessed data, program control returns to step S1507 and the above processing is repeated, and a variety of information concerning the data is added to the data list information.

When all the data have been analyzed, a hand-held information terminal communication unit 203 transmits the index information to the hand-held information terminal 1301 (step S1512). At step S1512, when the thumbnail file was prepared at step S1509, this thumbnail file is also transmitted. In the hand-held information terminal (C)1301, the server communication unit 301 receives the index information and the thumbnail file output at step S1512 (step S1513), and stores the received information and the file in an index information storage unit 307 (step S1514). The process sequence is thereafter terminated.

According to the third embodiment, the index information and the thumbnail file obtained through the processing in FIG. 15 are displayed on the display unit 306. When the owner of the home server (D)1310 finds desired data, the owner employs the input unit 305 of the hand-held information terminal (C)1301 to designate the data. Thereafter, by performing the processing shown in FIG. 11 for the first embodiment, a request is issued for the transfer of the designated data from the home server (C)1300 to the home server (D)1310. As a result, the same effects as are obtained for the first embodiment can also be provided for the third embodiment, and the number of system components can be reduced.

According to the first to third embodiments, hand-held information terminals are employed; however, the present invention can also be applied for a system that employs ordinary information terminals. That is, a first information terminal (A)101 receives index information from the home server (A)100 and transmits the index information to a second information terminal (B)111. Then, when a request for the transfer of data to the home server (B)110 is issued using the index information, data can easily be transmitted from the home server (A)100 to the home server (B)110.

With this arrangement, when a limit is imposed on the transfer of data from the home server (A)100 to the second information terminal (B)111, e.g., when the amount of data to be transferred exceeds the maximum data capacity that is designated, or when the transfer of data to the second information terminal (B)111 is not preferable because of the contents of the data, the index information need only be examined, and data can be transmitted directly to the home server (B)110 for which no such limit is imposed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data transfer method for use in a system including a first server computer, a second server computer, a first hand-held information terminal and a second hand-held information terminal, the method comprising the steps of:

generating index information including (a) data identification information for identifying data stored in the first server computer and (b) an address of the first server computer on a network and transmitting the index information from the first server computer to the first hand-held information terminal, in response to an index information request from the first hand-held information terminal;

receiving the index information from the first server computer at the first hand-held information terminal;

transmitting the received index information, which includes the data identification information and the network address of the first server computer, from the first hand-held information terminal to the second hand-held information terminal;

transmitting a request signal from the second hand-held information terminal to the first server computer in accordance with the first server computer network address in the index information, the request signal including the data identification information and an address of the second server computer on a network and the request signal requesting the first server computer to transmit the data stored in the first server computer to the second server computer; and establishing a connection between the first server computer and the second server computer using the network address of the second server computer in the request signal by the first server computer in response to reception of the request signal and transmitting the data identified by the data identification information in the request signal to the second server computer by the first server computer.

2. A data transfer method according to claim 1, wherein the system further includes a third server computer and a third hand-held information terminal, the method further comprising:

transmitting the received index information to the third hand-held information terminal from the first hand-held information terminal;

transmitting a request signal for transmitting the data to the third server computer from the third hand-held information terminal to the first server computer in accordance with the index information; and transmitting the data to the third server computer from the first server computer in accordance with the request signal.

3. A server computer system having a server computer storing data, further comprising:

an index information management unit adapted for generating index information that includes data identification information for identifying data stored in a first the server computer and an address of the first server computer on a network and storing the index information; and a communication unit adapted for transmitting, from the first server computer to a first hand-held information terminal, the index information stored by the index information management unit, wherein the index information is received at a second hand-held information terminal from the first hand-held information terminal, and wherein:

the communication unit receives a transfer request signal from the second hand-held information terminal that includes the data identification information and an address of a second another server computer on the network and the communication unit transmits the data identified by the data identification information in the transfer request to the second server computer on the address specified by the second server computer network address in the transfer request.

4. A server computer system according to claim 3, wherein the index information includes number of transfer times of the index information and maximum allowable number of the transfer times of the index information.

5. A server computer system according to claim 4, wherein number of copy times for the data is limited after transmitting the data to the second server computer.

6. A server computer system according to claim 3, wherein the index information management unit generates the index information on requesting a transmission of the index information from the first hand-held information terminal.

7. A server computer system according to claim 3, wherein the index information management unit generates the index information for the data when storing the data.

8. A server computer system according to claim 3, wherein the communication unit includes a data list generating unit for analyzing the storing data and generating a data list after receiving a data list request signal from the first hand-held information terminal, and the communication unit transmitting the data list to the first hand-held information terminal.

9. A server computer system according to claim 3, further comprising, a data transfer unit which fails to transfer the data to another device by the communication unit in a case where copyright information is included in the data stored in the server computer system and indicates to inhibit for transferring the data.

* * * * *

UNITED STATES PATENT AND TRADEMARK OFFICE
CERTIFICATE OF CORRECTION

PATENT NO. : 7,516,164 B2
APPLICATION NO. : 10/893736
DATED : April 7, 2009
INVENTOR(S) : Wakabayashi It is certified that error appears in the above-identified patent and that said Letters Patent is hereby corrected as shown below:

Cover Page:

item [73] Assignee: should read as follows --Hitachi, Ltd., Tokyo (JP)--

Signed and Sealed this

Nineteenth Day of January, 2010

David J. Kappos
*Director of the United States Patent and Trademark Office*